(12) United States Patent
Yamada

(10) Patent No.: US 7,174,287 B2
(45) Date of Patent: Feb. 6, 2007

(54) DISPLAY LANGUAGE CONVERSION SYSTEM, STORAGE MEDIUM AND INFORMATION SELLING SYSTEM

(75) Inventor: Toshiya Yamada, Tokyo (JP)

(73) Assignee: Kodansha Co., Ltd., Tokyo (JP)

( * ) Notice: Subject to any disclaimer, the term of this patent is extended or adjusted under 35 U.S.C. 154(b) by 1034 days.

(21) Appl. No.: 09/838,554

(22) Filed: Apr. 20, 2001

(65) Prior Publication Data

US 2002/0007265 A1    Jan. 17, 2002

(30) Foreign Application Priority Data

Apr. 28, 2000   (JP)   ............................ 2000-130863

(51) Int. Cl.
    *G06F 17/28* (2006.01)
    *G06F 17/27* (2006.01)
    *G06F 17/21* (2006.01)
    *G06F 17/20* (2006.01)

(52) U.S. Cl. ....................... 704/2; 704/8; 704/9; 704/10
(58) Field of Classification Search .................... 704/2, 704/3, 4, 5, 7, 8, 9, 10; 434/156, 157; 345/171; 715/530, 910
See application file for complete search history.

(56) References Cited

U.S. PATENT DOCUMENTS

| | | | | |
|---|---|---|---|---|
| 5,031,121 | A * | 7/1991 | Iwai et al. | 715/515 |
| 5,797,011 | A * | 8/1998 | Kroll et al. | 717/137 |
| 5,882,202 | A * | 3/1999 | Sameth et al. | 434/157 |
| 2001/0056352 | A1 * | 12/2001 | Xun | 704/277 |

FOREIGN PATENT DOCUMENTS

JP    7-93368    4/1995

(Continued)

OTHER PUBLICATIONS

Electric Spirit, the online comics magazine, Menagerie Publications, 2000.*

(Continued)

*Primary Examiner*—Tālivaldis Ivars Šmits
*Assistant Examiner*—Abdelali Serrou
(74) *Attorney, Agent, or Firm*—Rader, Fishman & Grauer PLLC

(57) ABSTRACT

The display language conversion system of the present invention comprises a first data base 303a, a second data base 303b, an image display processing means 51 and an another-language display processing means 52. The image display processing means 51 displays control data read from the first data base 303a, image data and one language data read from the position information data and the second data base 303b, on a display 3. When the display mode and the display language are specified by the display by the control data displayed on the display 3 and the mouse, and the blowoff frame or the predetermined commentary display region is region specified by the input means, the another-language display processing means 52 displays another language related to the second data base by the region specification in accordance with the display mode. Thus, according to the present invention, without impairing the images of illustrations, photographs and comics and the like, words or commentaries contained therein can be freely displayed by various languages.

3 Claims, 13 Drawing Sheets

FOREIGN PATENT DOCUMENTS

| | | |
|---|---|---|
| JP | 10-240953 | 9/1998 |
| JP | 11-045245 | 2/1999 |
| JP | 11-143953 | 5/1999 |
| JP | 11-265382 | 9/1999 |
| JP | 2000-112751 | 4/2000 |
| WO | WO 98/11523 | 3/1998 |

OTHER PUBLICATIONS http://web.archive.org/web/19991129021746://www13.google.com/, published Nov. 29, 1999.*

Dartois et al, "A Multilingual Electronic Text Collection of Folk Tales for Casual Users using Off-the-Shelf Browsers" D-LIB Magazine, (Online) vol. 3, No. 10, Oct. 1997 XP-002214941.

Jeffrey D. Ullman, "Principles of Database and Knowledge-Base Systems" Computer Science Press, vol. 1, 1988.

European Search Report dated Oct. 11, 2002.

Japanese Office Action issued on Nov. 19, 2003.

* cited by examiner

DISPLAY LANGUAGE CONVERSION SYSTEM, STORAGE MEDIUM AND INFORMATION SELLING SYSTEM

BACKGROUND OF THE INVENTION

1. Field of the Invention

The present invention relates to a display language conversion system which converts words displayed in an illustration, a photograph, a blowoff frame of a comic or the like and in a commentary displayed in a predetermined commentary display region, to another language and can display the language, and a storage medium in which a program capable of realizing the display language conversion system by a computer was stored, as well as an information selling system which is capable of selling the display language conversion system program via a communication network.

2. Prior Art

Conventionally, various display language conversion systems, which convert one language to another language and display it, have been proposed.

Of such display language conversion systems, a display language conversion system described in, for example, Japanese Unexamined Patent Publication No. Hei. 11-331723, is configured such that in an area where broadcasting in a number of different languages is conducted, when one of the languages is preset so as to be received, then an operating display screen displaying the preset language is automatically displayed (first prior art).

Further, another example of a conventional display language conversion system is a system that displays comics using a personal computer or the like has been proposed. In this system, words in one language displayed inside the blowoff frame of the comics (here, the "blowoff frame" which is in a shape blown off from a speaker's mouth in an illustration, a photograph and a comic, means a figure which surrounds words) are removed and the words in another language are written inside the blowoff frame (second prior art).

However, with the first prior art, a number of language data are stored in a storage (memory) means based on the channel plans and when one language based on the channel plan is preset so that it can be received, at a required time of operations of the channel change and the volume control the language data read out from the storage means are displayed on the operating display screen of the display means. Accordingly, in the prior art the contents to be displayed on the screen are limited and selected languages are only displayed on the screen once it is preset. Thus the first prior art can not display any other language in any portion of the display screen.

In addition, in the above-mentioned second prior art, another language is only displayed in a blowoff frame portion, an operation such as scroll or the like must be performed to look at all the sentences crowded out of the blowoff frame for a certain language. Thus, the entire words or commentaries cannot be read. Further, when an attempt is made to prevent crowding out, the size of the display language reduces and the display languages become difficult to look at.

In view of the above-mentioned problems, an object of the present invention is to provide a display language conversion system, which can freely convert words or commentaries to another language without impairing the images of an illustration, a photograph and a comic displayed and can freely set a display position for words or commentaries, and a storage medium in which a program capable of realizing the display language conversion system by a computer is stored, as well as an information selling system which is capable of selling the display language conversion system program via a communication network.

DISCLOSURE OF THE INVENTION

A display language conversion system in an image processing system by a computer comprises:

a storage means for storing a first data base comprised of an image data such as an illustration, a photograph, a comic and the like, a position information data related to display positions of a blowoff frame and a commentary display region and control data for specifying a display mode and a display language, and a second data base comprised of other language data corresponding to words and a commentary related to the blowoff frame and a predetermined commentary display region;

an image display processing means for displaying on a display means the control data, the image data and the position information data read from the first data base and data of one language read from the second data base; and an another-language display processing means in which when the display mode and the display language are specified by a display by the control data displayed on the display means and an input means, and the blowoff frame or the predetermined commentary display region is region specified by the input means, the another-language display processing means displays on the display means another language relating it to the second data base by the region specification in accordance with the display mode.

Thus, according to the present invention, without impairing an image such as an illustration, a photograph, a comic or the like, it is possible to display in multi-languages the words or commentaries contained therein. Further, according to the display language conversion system of the present invention, it is possible to freely set a language which is displayed in a blowoff frame. That is, a language in a plurality of blowoff frames and commentary display regions can be displayed in a different language every blowoff frame and commentary display region. Therefore, if the display language conversion system according to the present invention is utilized as a teaching material for learning languages, learning efficiency can be enhanced by utilizing comics expressed by patterns and designs and selectively displaying only portions in the character's words of comics or the commentary of a story, which cannot be translated by a user during the process of reading it. In addition, according to the display language conversion system of the present invention, the display position of the blowoff words can be freely set. That is, according to the present invention, it is possible to select the display position of converted words to any one of a space portion of an image, an optional position in a image and a blowoff frame or a commentary display region in an image. Accordingly, since the overlapping of the converted words and the image can be made as small as possible, the impairing of an image such as an illustration, a comic, a photograph and the like can be reduced.

Further, the second data base in the display language conversion system is capable of using font data with respect to a language of a font which this system possesses, and can be formed as image data with respect to another language of a font which this system does not possess. According to the present invention, any language can be displayed.

Further, the another-language display processing means in the display language conversion system can be formed as a processing means in which when the blowoff frame or the commentary display region is specified by an input means, at the first display mode, the specified another language is displayed in a space portion of a displayed image, at the second display mode the specified another language is displayed at an optional position of a displayed image, or at the third mode, the specified another language is displayed in a blowoff frame or a commentary display region of a displayed image. According to the present invention, various kinds of displayed forms can be selected by the display mode.

Further, a storage medium of the present invention is formed as one that stores a program for functioning a computer as the display language conversion system according to the present invention described above. The present invention permits simple selling and is capable of serving the learning of language.

Further, the information selling system of the present invention comprises a server device and a terminal device connected to the server device through a communication system, the server device comprising:

a storage means for storing a display language conversion system program comprising:

a first data base comprised of an image data such as an illustration, a photograph, a comic and the like, a position information data relating it to display positions of a blowoff frame and a predetermined commentary display region and control data for specifying a display mode and a display language, and a second data base comprised of other language data corresponding to words and commentary relating it to the blowoff frame and the predetermined commentary display region;

a program for realizing an image display processing means for displaying on a display means the control data, the image data and the position information data read from the first data base and one language data read from the second data base; and a program for realizing an another-language display processing means in which when the display mode ad the display language are specified by a display by the control data displayed on the display means and an input means, and the blowoff frame or the a predetermined commentary display region is region specified by the input means, the another-language display processing means for displaying on the display means another language relating it to the second data base by the region specification in accordance with the display mode, and a selling processing means in which when sending of the display language conversion system program is required from the terminal device and a predetermined condition is fulfilled, the display language conversion system program is sent.

According to the present invention, the display language conversion system program can be rapidly and widely sold regionally and also various display forms can be selected by selecting the display mode, whereby various display forms can be enjoyed.

The second data base in the information selling system uses the font data with respect to other languages of fonts which this system possesses, and is formed as image data with respect to other languages of fonts which this system does not possess. Thus, a special processor and a processing program are not required.

The program for realizing the another-language display processing means in the above-described information selling system comprises a processing program in which when the blowoff frame or the commentary display region is specified by an input means, at the first display mode, the specified another language is displayed in a space portion of a displayed image, at the second display mode, the specified another language is displayed at an optional position of a displayed image, or at the third mode the specified another language is displayed in a blowoff frame or a commentary display region of a displayed image. Thus, according to the present invention, various display forms can be selected by the display modes and it becomes possible to enjoy various display forms.

The contents of this invention are not limited to the above-mentioned explanations, and other objects, advantages, features and applications will become further apparent from the following descriptions given with reference to accompanied drawings. It should be understood that all of appropriate modifications without departing from the spirit of the invention are included within the scope of this invention.

MODE FOR CARRYING OUT THE INVENTION

Embodiments of the present invention will be described below with reference to drawings.

1. First Embodiment (FIGS. 1 to 13)

FIGS. 1 to 13 show configuration examples of a display language conversion system of the first embodiment.

1.1 Explanation of System Configuration

Figure 1:
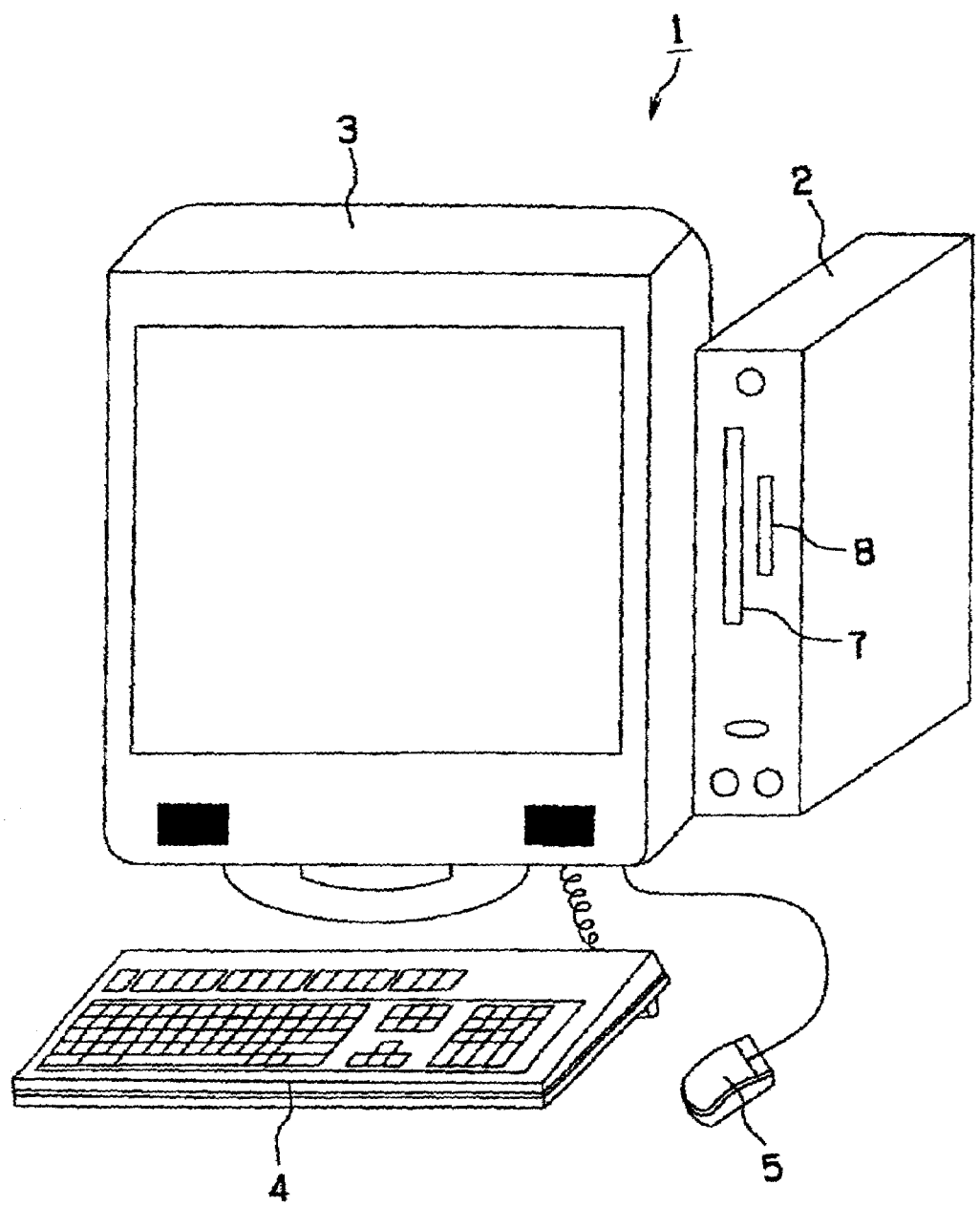
FIG. 1 is an external view of an example of a hardware for realizing a display language conversion system according to a first embodiment of the present invention.

In FIG. 1, a computer system 1 may be comprised of, for example, a personal computer or the like, and comprises a computer body 2 which executes various processing, a display 3 used as a display means which displays the display data from this computer body 2, a keyboard 4 used as an input means which directly inputs information necessary for various processing with characters (letters), figures or symbols or the like, and a mouse used as an input means which inputs data or the like through a screen of a monitor 3 that executes various processings. Further, the computer body 2 includes a CD-ROM drive 7 that reads a CD-ROM and a flexible disk drive (FDD) 8.

Figure 2:
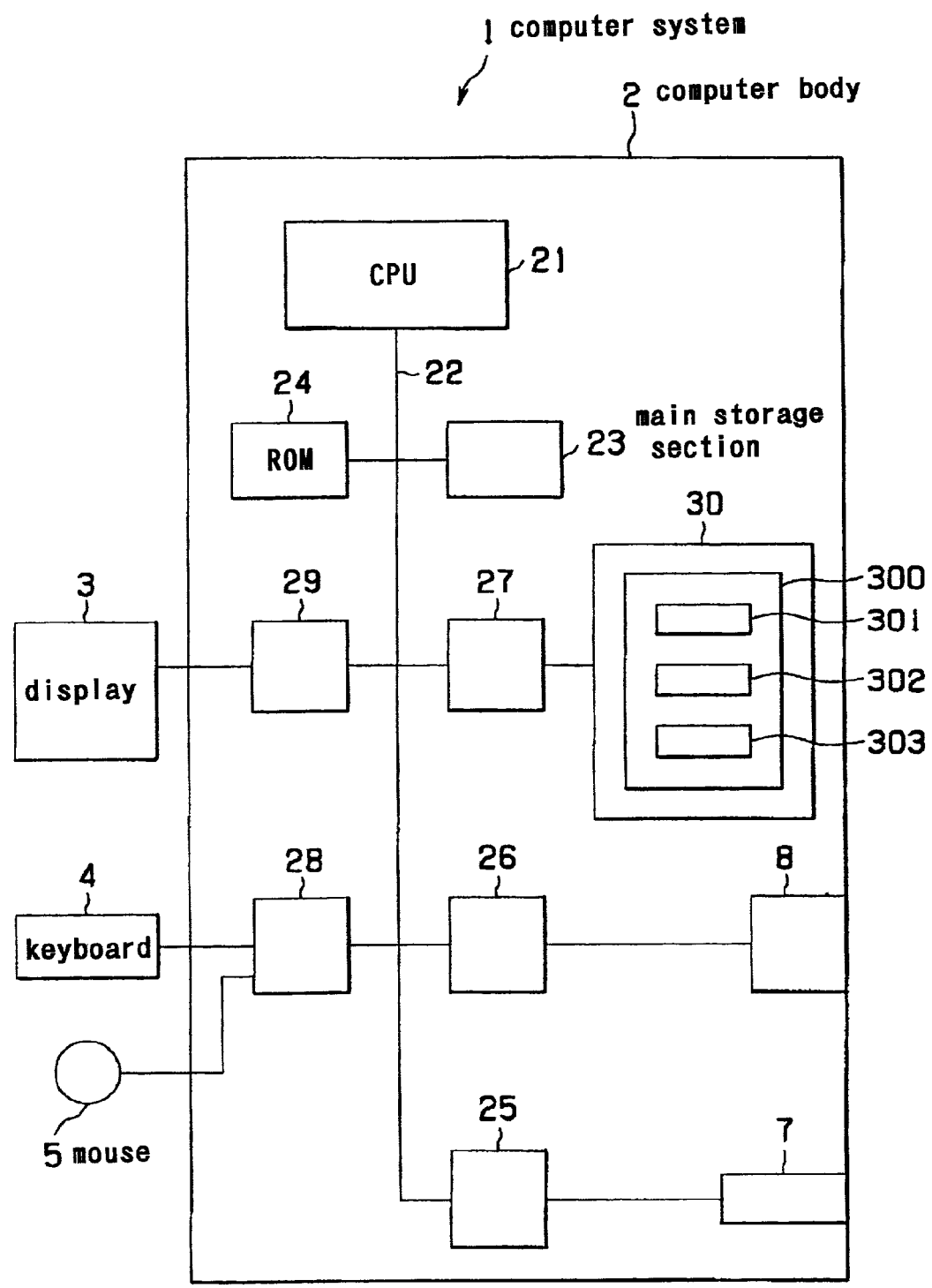
FIG. 2 is a block diagram showing an example of a concrete configuration of the hardware for realizing the display language conversion system according to the embodiment of the present invention.

In FIG. 2, the computer body 2 comprises a central processing unit (CPU) 21 that executes various computing processings, a main storage section 23 which is connected to this CPU 21 through a bus line 22, a ROM 24 which is connected to the CPU 21 through a bus line 22, a CD-ROM controller 25 which is connected through a bus line 22, a flexible disk (FD) controller 26 which is connected to the bus line 22, a hard disk (HD) controller 27 which is connected to the bus line 22, a keyboard/mouse controller 28 which is connected to the bus line 22, a monitor interface (monitor I/F) 29 which is connected to the bus line 22, a CD-ROM drive 7 which is connected to the CD-ROM controller 25, an FDD 8 which is connected to the FD controller 26, and an internal hard disk storage 30 which is connected to the controller 27.

Here, the keyboard 4 and the mouse 5 are connected to the keyboard/mouse controller 28. Further, the display 3 is connected to the monitor I/F 29.

In a hard disk storage 30 is stored a display language conversion system program 300 which realize the display language conversion system according to the first embodiment. This display language conversion system program 300 comprises an operation system 301 such as a Windows 98 or a Windows NT (registered trademark) provided by Micro Soft Co. in the United States, for performing basic operations between this program 300 and the computer body 2, an application program 302 which executes concrete operations of the display language conversion system, and a data base 303 that stores data for displaying by the application program 302.

In the computer system 1 having such a configuration, when the power supply of the computer body 2 is turned on, the CPU 21 of the computer body 2 executes the initial processing depending on the initial processing program of, for example, BIOS or the like, which is stored in the ROM 24, and places and stores the display language conversion system program 300 (operating system 301, application program 302 and data base 303), which is stored in the hard disk storage 30, to the main storage section 23. Then, by executing the display language conversion system program 300 placed in the main storage section 23, the computer system 1 realizes the display language conversion system according to this embodiment.

Figure 3:
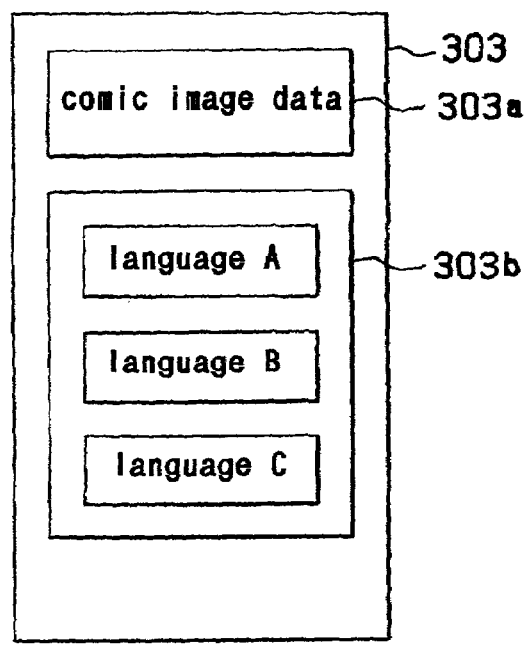
FIG. 3 is an explanatory view showing an example of data configuration used in the display language conversion system according to the embodiment.

In FIG. 3, the data base 303 comprises a first data base 303a and a second data base 303b. Here, the first data base 303a is comprised of a data base for displaying a basic screen configuration, and the second data base 303b is comprised of a data base which displays languages A, B, C, . . .

Figure 4:
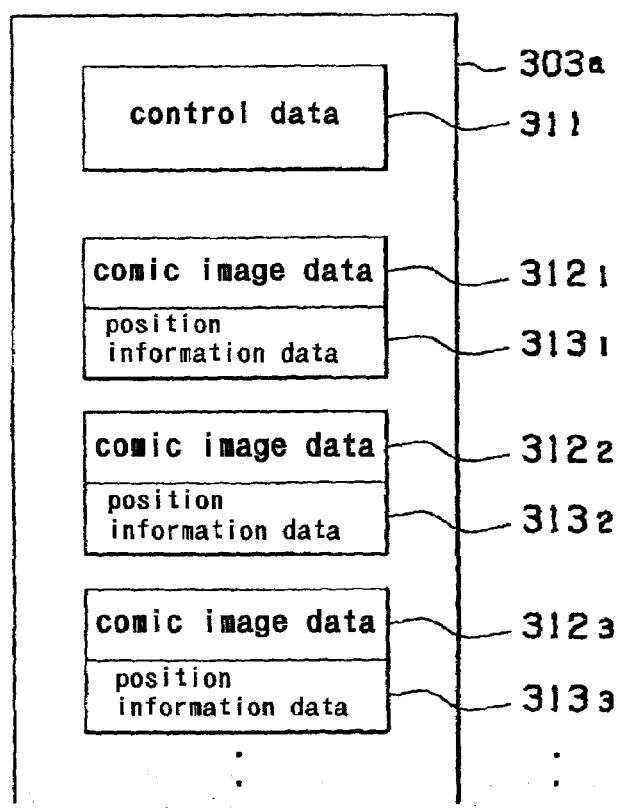
FIG. 4 is an explanatory view showing an example of a first data base configuration used in the display language conversion system according to the embodiment.
Figure 5:
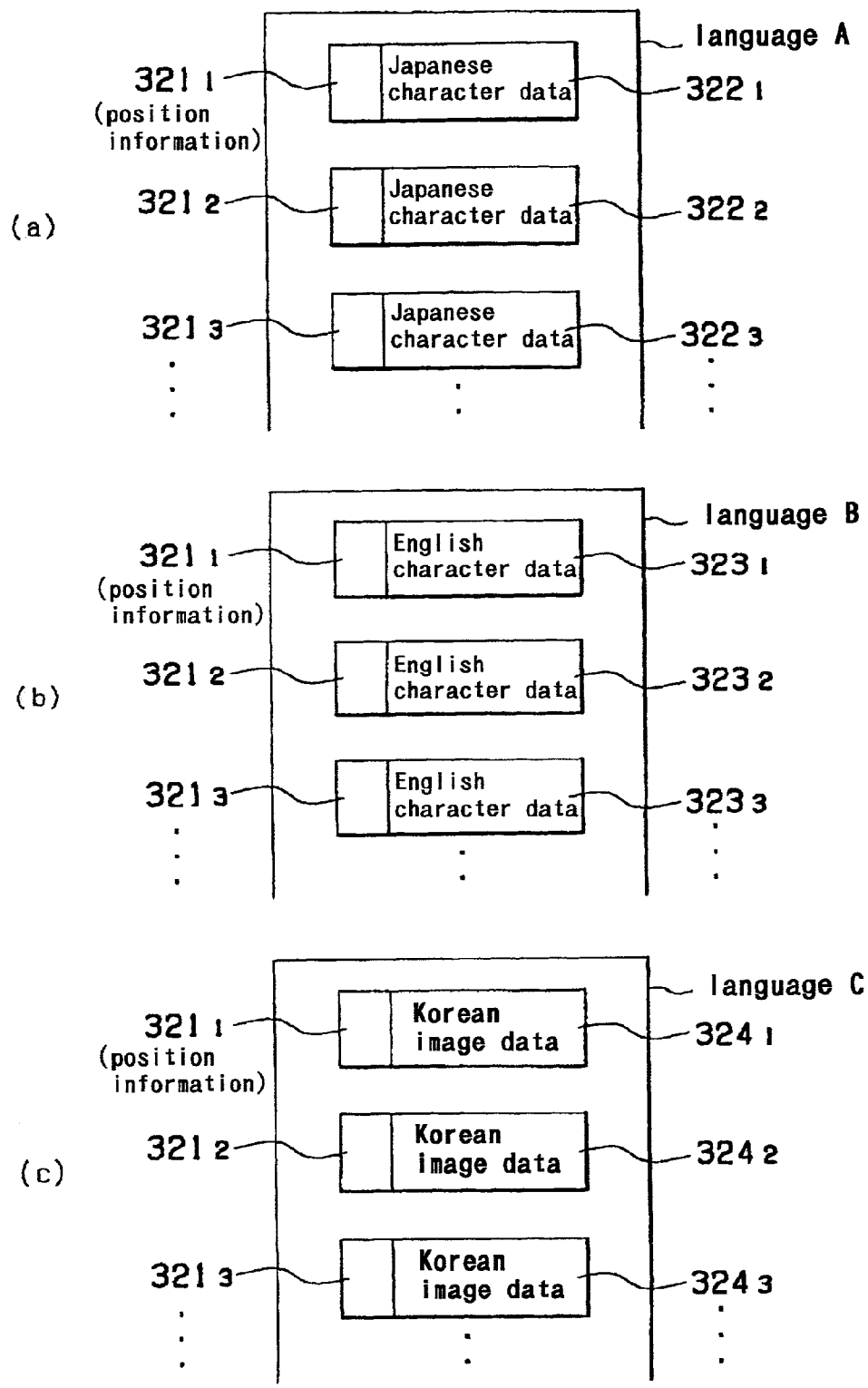
FIG. 5(a) is an explanatory view showing an example of data configuration of a language A (Japanese) in the display language conversion system according to the embodiment.
FIG. 5(b) is an explanatory view showing an example of data configuration of a language B (English) in the display language conversion system according to the embodiment.
FIG. 5(c) is an explanatory view showing an example of data configuration of a language C (Korean) in the display language conversion system according to the embodiment.

In FIG. 4, the first data base 303a (see FIG. 3) stores control data 311 for specifying the display mode and the display language, an image data $312_1$, $312_2$, $312_3$ . . . , such as an illustration, a photograph, and a comic and the like, and position information data $313_1$, $313_2$, $313_3$ . . . , such as display positions and display ranges of the blowoff frame and a predetermined commentary display region which correspond to the image data $312_1$, $312_2$, $312_3$ . . . , respectively. Further, the control data 311 has information of the display positions, and the display positions, when the image data $312_1$, $312_2$, $312_3$ . . . are displayed, are determined.

In FIG. 5(a), the language A (see FIG. 3) of the second data base 303b is, for example, Japanese, and the second data base 303b has the position information $321_1$, $321_2$, $321_3$ . . . to be related to the blowoff frame or the predetermined commentary display region. Further, the second data base 303b contains Japanese character data $322_1$, $322_2$, $322_3$, . . . corresponding to the position information $321_1$, $321_2$, $321_3$, . . . , respectively.

In FIG. 5(b), the language B of the second data base 303b is, for example, English, and the second data base 303b has the position information $321_1$, $321_2$, $321_3$ . . . to be related to the blowoff frame and predetermined commentary display region. Further, the second data base 303b contains English character data $323_1$, $323_2$, $323_3$, . . . corresponding to these position information $321_1$, $321_2$, $321_3$, . . . , respectively.

In FIG. 5(c), the language C of the second data base 303b is, for example, Korean, and the second data base 303b has the position information $321_1$, $321_2$, $321_3$ . . . to be related to the blowoff frame and predetermined commentary display region. Further, the second data base 303b *contains Korean character data* $324_1$, $324_2$, $324_3$, . . . , corresponding to the position information $321_1$, $321_2$, $321_3$, . . . , respectively.

Figure 6:
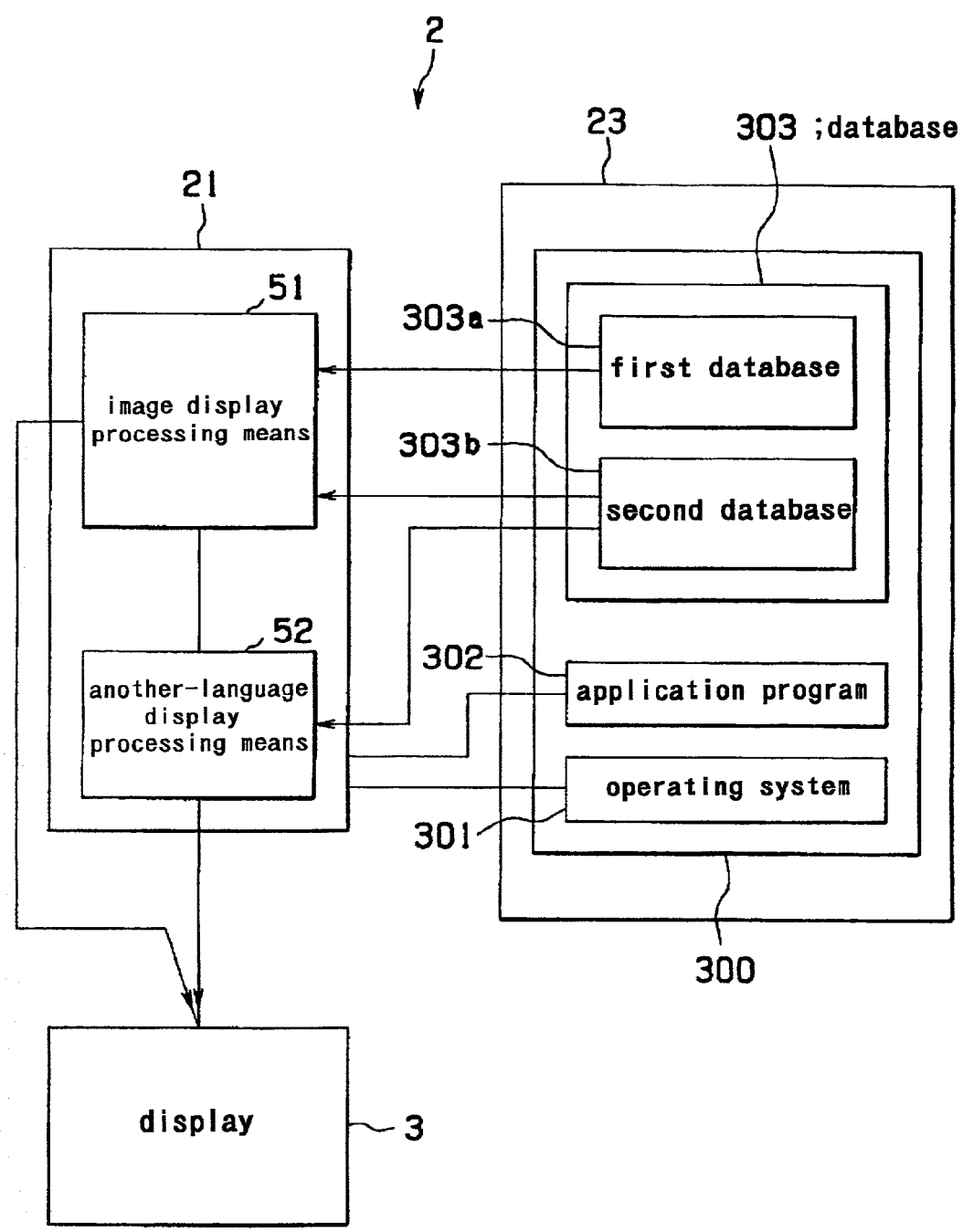
FIG. 6 is a block diagram for explaining a portion of the configuration elements of the display language conversion system according to the embodiment.

In FIG. 6, the CPU 21 of the computer body 2 of the computer system 1 realizes an image display processing means 51 and an another-language display processing means 52 by executing the display language conversion system program 300 placed in the main storage section 23.

The image display processing means 51 includes a function of generating image signals based on the control data 311, image data $312_1$, $312_2$, $312_3$, . . . , the position information data $313_1$, $313_2$, $313_3$, . . . , read from the first data base 303a, and Japanese character data $322_1$, $322_2$, $322_3$, . . . read from the second data base 303b, to display them on the display 3.

In addition, when a display mode and a display language are specified by the image by the control data 311 displayed on the display 3 and the operation of the mouse 5, and when the blowoff frame or the predetermined commentary display region displayed on the display 3 are specified by an operation of the mouse 5, the above-mentioned another-language display processing means 52 includes a function of displaying other languages, such as English character data 323₁, 323₂, 323₃, . . . , or Korean image data 324₁, 324₂, 324₃, . . . related from the second data base 303b by the region specification, on the display 3 in accordance with the specified display mode.

Note that the display language conversion system is comprised of the image display processing means 51, the another-language display processing means 52, the first data base 303a and the second data base 303b.

1. 2 Explanation of Operation

Next, the operations and modes of the display language conversion system according to the first embodiment having the above-explained configuration, will be described with reference to FIGS. 7 to 13 based on FIGS. 1 to 6.

Figure 7:
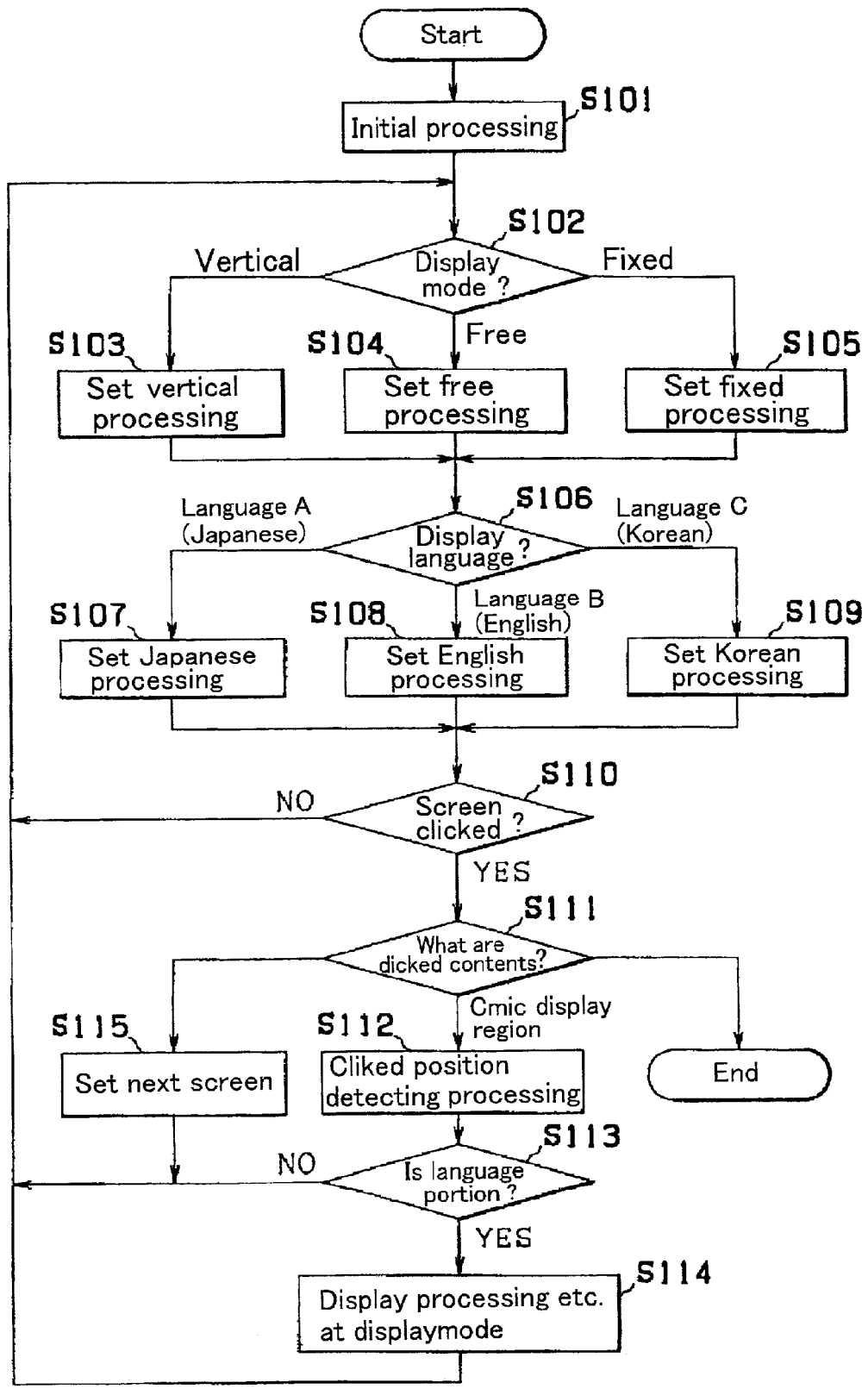
FIG. 7 is a flowchart for explaining operation examples of the display language conversion system according to the embodiment.

When the display language conversion system is activated, CPU 21 provided in the computer body 2 in the computer system 1 places the display language conversion system program 300 (operating system 301, application program 302 and data base 303) from the hard disk storage 30 to the main storage section 23, and executes the processing shown in the flowchart of FIG. 7.

1. 2. 1 Initial Processing

First, the CPU 21 realizes the function as the image display processing means 51 and executes the subsequent initial processing as the image display processing means 51 (S101). That is, the image display processing means 51 reads the control data 311, image data 312₁ and position information data 313₁ from the first data base 303a as the initial processing (S101), and reads Japanese character data 322₁ from the position information 321₁ of the second data base 303b based on the read position information data 313₁ to convert these data to display data, thereby executing processing to display on the display 3. In this case, only one of the position information 321₁ of the second data base 303b is displayed in FIGS. 5(a) to 5(c). However, the inside of the position information 321₁ has the information corresponding to the positions of the respective blowoff frames. In accordance with this information, image data of Japanese character data, English character data and Korean image data are arranged therein.

Note that the embodiment sets in the initial processing (S101) so that "language A (Japanese)" is normally selected and "FREE" is set in the display mode.

Figure 8:
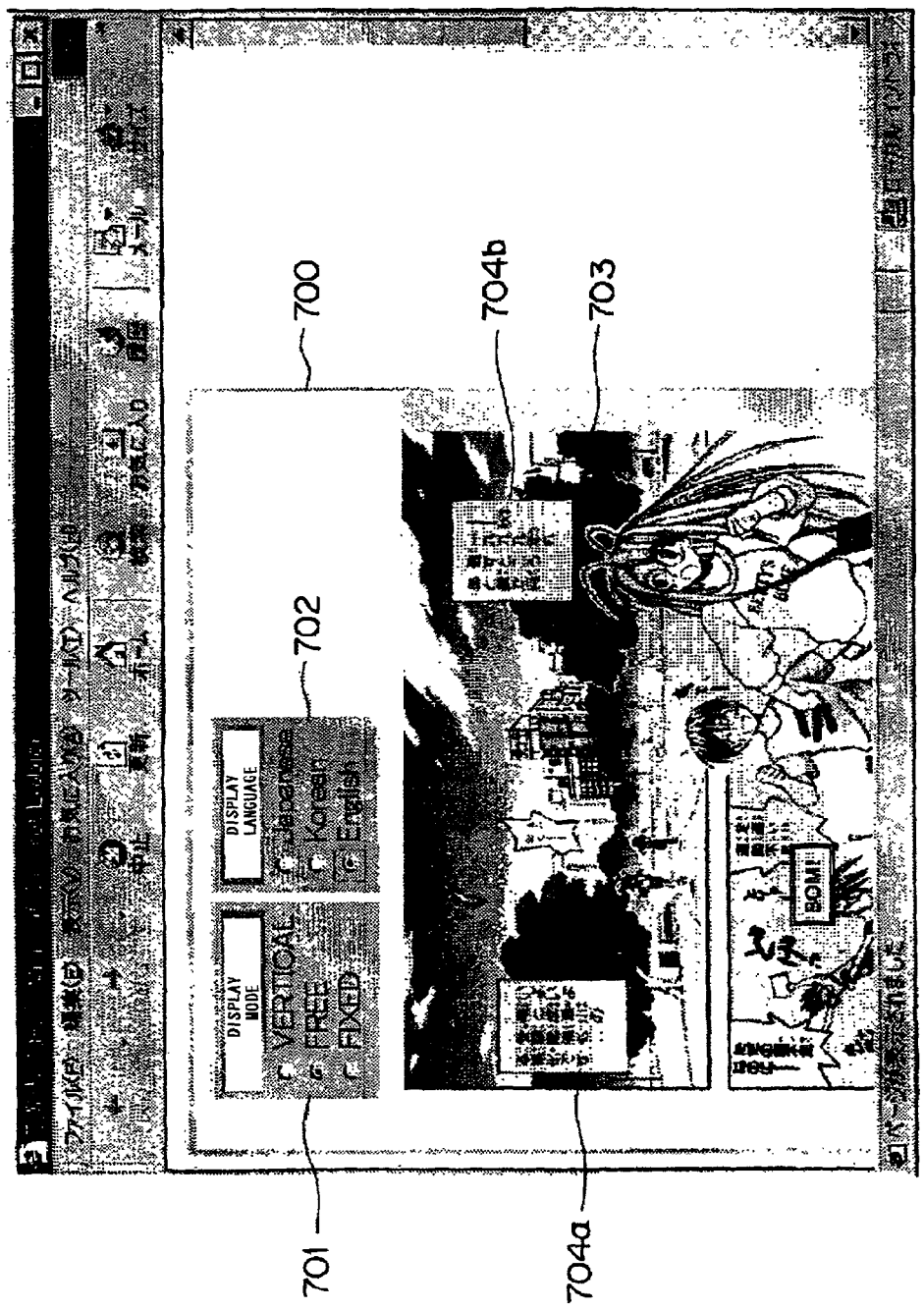
FIG. 8 is an explanatory view showing a display example of the expression of English in the case of the display mode of "FREE" in the display language conversion system according to the embodiment.

As described above, when the initial processing is executed by the image display processing means 51 (S101), an image 700 as shown in FIG. 8 is displayed on the display 3. On this screen 700, are displayed a mode selection window 701 of the display mode and a display language selection window 702 for selecting a display language by the control data 311. In addition, on the screen 700, are displayed a comic 703 by the image data 312₁ and the blowoff frames 704a, 704b, . . . based on the position information data 313₁. Furthermore, inside the blowoff frames 704a, 704b, . . . , Japanese character data 322₁ is selected based on the above-mentioned position information data 313₁ and the position information 321₁ of the second data base 303b to display words 705a, 705b, . . .

1. 2. 2 Operation Example 1

Next, it is assumed that while being selected "FREE" in the mode selection window of the screen 700 shown in FIG. 8, and by operating the mouse 5, for the display language selection window 702 "language B (English)" is selected.

Then, since "FREE" of the mode selection window 701 is selected (S102; FREE), the CPU 21 sets the mode to processing of the display mode of "FREE" (S104). Further, the CPU21 determines in the display language selection window 702, that "language B (English)" has been selected (S106; English) and sets so that the English data may be read (S108). Thus, in the another-language display processing means 52, the language selection is set for "English" and the display mode is set for "FREE".

Next, the another language display processing means 52 determines whether the screen 700 shown in FIG. 8 has been clicked by an operation of the mouse 5 (S110). Here, when the screen 700 is not clicked, the another-language display processing means 52 continuously display to process the initial processing data, and executes the selection processing of the display mode again (S102 to S105) and executes the selection processing of the display language (S106 to S109). In this case, this procedure is the same as that of the previous time. Thus, the processing of step S102→S104→S106→S108→S110→S102→ . . . , is repeated.

On the other hand, when the screen 700 shown in FIG. 8 is clicked with the mouse 5, the another-language display processing means 52 determines the clicked contents (S110→S111).

That is, when the another-language display processing means 52 determines that the portion of the comic 703 in the screen 700 has been clicked (S111; comic display region), it detects a position of the pointer of the mouse 5 (S112). Here, if the position of the detected pointer is not the blowoff frames 704a and 704b which display language (S113; NO), the another-language display processing means 52 displays nothing, and the processing returns back to step S102.

In contrast, when the another-language display processing means 52 determines that the position of the detected pointer is a portion of the blowoff frames 704a (S113; YES), it reads English character data 323₁ that is language B (see FIG. 5(b)) by relating, for example, the position information 321₁ of the second data base 303b based on the detected position data (S114). Since the display mode is set to "FREE" (S104), the another-language display processing means 52 arranges the English character data which corresponds to the words at the position of the blowoff frame 704a of the read English character 323₁, at an optional position of the image data of the comic 703 (S114). Since the display mode is "FREE", the another-language display processing means 52 stops the display of English when the pointer of the mouse 5 is out of the blowoff frame 704a, and displays the original Japanese in the blowoff frame 704a.

Figure 9:
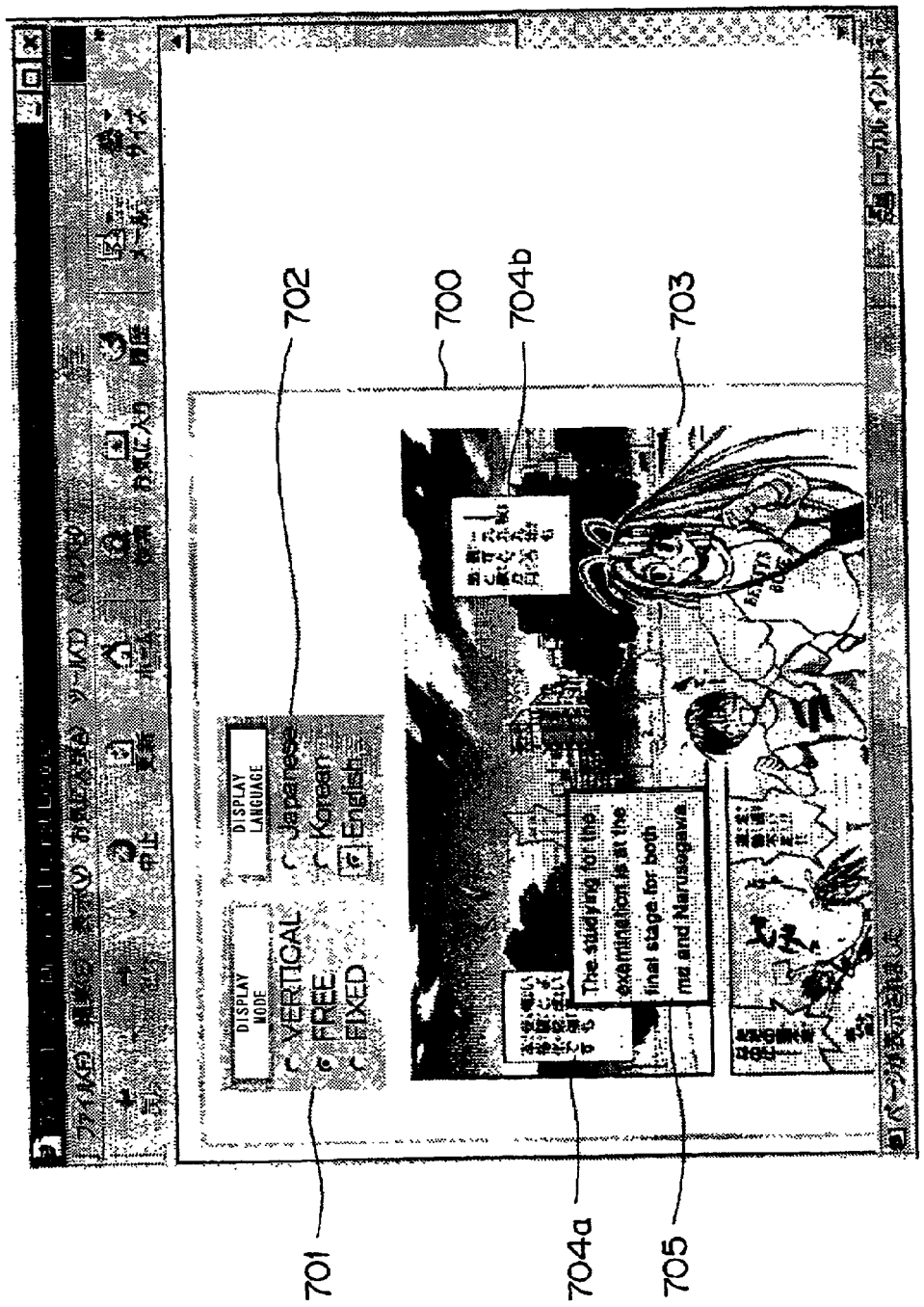
FIG. 9 is an explanatory view showing a display example of the expression of English in the case of the display mode of "FREE" in the display language conversion system according to the embodiment.

Accordingly, Japanese contents in the blowoff frame 704a specified with the mouse 5 is displayed in an optional display region 705 for the comic 703 on the display 3 as English sentences, as shown in FIG. 9.

1. 2. 3 Operation Example 2

Operation example 2 will be explained referring to step S102 again. Here, it is assumed that while looking at the screen 700 the mouse 5 is used to select "FIXED" from the mode selection window 701 on the screen 700 and to select "language B (English)" from the display language selection window 702, as shown in FIG. 10.

Then, since "FIXED" in the mode selection window 701 is selected (S102; FIXED), the another-language display processing means 52 sets the processing of the display mode of "FIXED" (S105). Further, the another-language display processing means 52 determines that "language B (English)" has been selected in the display language selection window 702 (S106; English), it is set so that the English data can be read (S108).

Figure 10:
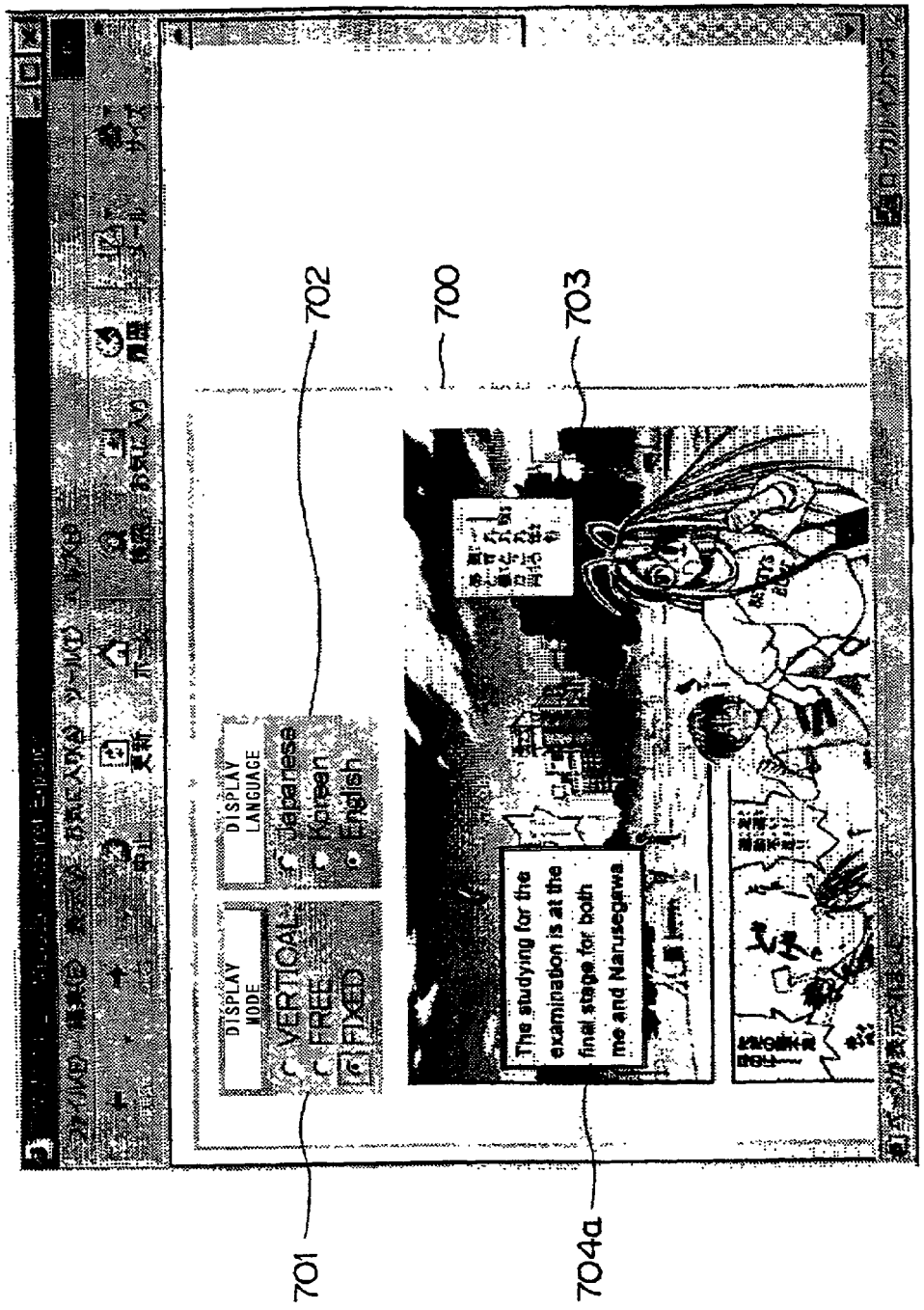
FIG. 10 is an explanatory view showing a display example of the expression of English in the case of the display mode of "FIXED" in the display language conversion system according to the embodiment.

Next, the another-language display processing means 52 determines whether or not the screen 700 shown in FIG. 10 has been clicked with mouse 5 (S110). Here, if the screen 700 is not clicked, the another-language display processing means 52 continuously executes to display processing of the initial processing data, and processing is repeated as step S102→S105→S106→S108→S110→S102→ . . . .

On the other hand, when the screen 700 shown in FIG. 10 is clicked with the mouse 5, the another-language display processing means 52 determines the clicked contents (S110→S111).

That is, when the another-language display processing means 52 determines that the portion of the comic 703 in the screen 700 has been clicked (S111; comic display region), it detects a position of the pointer of the mouse 5 (S112). Here, if the position of the detected pointer is not the blowoff frames 704a and 704b which display language (S113; NO), the another-language display processing means 52 displays nothing, and the processing returns back to step S102.

In contrast, when the another-language display processing means 52 determines that the position of the detected pointer is a portion of the blowoff frames 704a (S113; YES), it reads English character data $323_1$ for language B (see FIG. 5(*b*)) by relating, for example, the position information $321_1$ of the second data base 303b based on the detected position data (S114). Since the display mode is set to "FIXED" (S105), the another-language display processing means 52 arranges the English character data which corresponds to the words at the position of the blowoff frame 704a of the English character $323_1$, inside the blowoff frame 704a of the image data of the comic 703 (S114). When the display mode is set to "FIXED", even if the pointer of the mouse 5 is moved outside the portion of the blowoff frame 704a, the another-language display processing means 52 operates so that the display of English does not disappear until the pointer of the mouse 5 hits the portion of another blowoff frame 704b, . . . .

Accordingly, Japanese contents in the blowoff frame 704a specified with the mouse 5 is displayed inside the blowoff frame 704a of the comic 703 on the display 3 as English sentences, as shown in FIG. 10.

1. 2. 4 Operation Example 3

Operation example 3 will be explained referring to step S102 again. Here, it is assumed that while looking at the screen 700, the mouse 5 is operated to select "VERTICAL" from the mode selection window 701 on the screen 700 and to select "language C (Korean)" from the display language selection window 702, as shown in FIG. 11.

Then, since "VERTICAL" in the mode selection window 701 is selected (S102; VERTICAL), the another-language display processing means 52 sets the processing of the display mode of "VERTICAL" (S103). Further, the another-language display processing means 52 determines that "language C (Korean)" has been selected in the display language selection window 702 (S106; Korean), it is set so that the Korean data can be read (S109).

Figure 11:
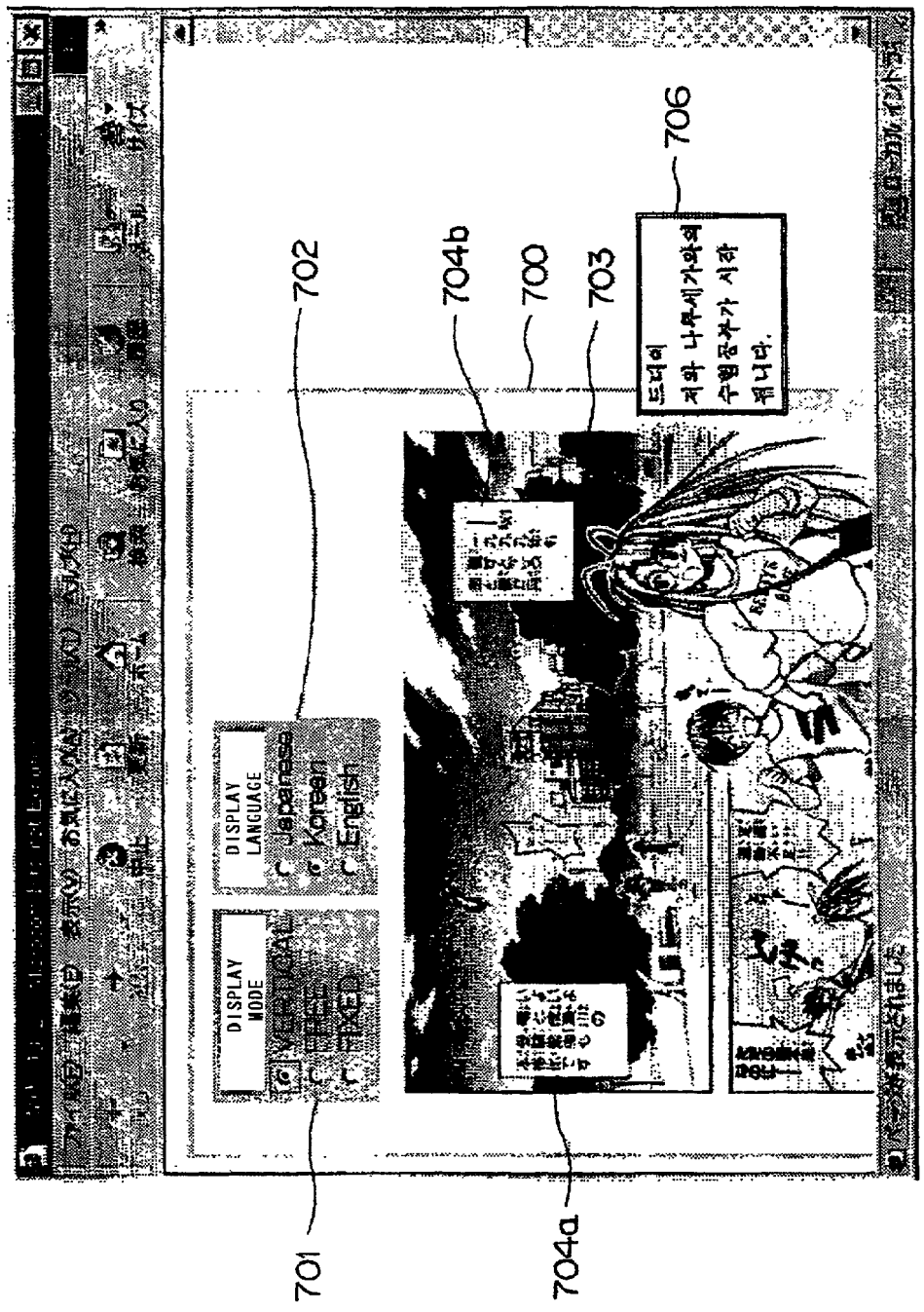
FIG. 11 is an explanatory view showing an display example of the expression of Korean in the case of the display mode of "VERTICAL" in the display language conversion system according to the embodiment.

Next, the another-language display processing means 52 determines whether or not the screen 700 shown in FIG. 11 has been clicked with the mouse 5 (S110). Here, if the screen 700 is not clicked, the another-language display processing means 52 continuously executes display processing of the initial processing data, and processing is repeated as step S102→S103→S106→S109→S110→S102→ . . . .

On the other hand, when the screen 700 shown in FIG. 11 is clicked with the mouse 5, the another-language display processing means 52 determines the clicked contents (S110→S111).

That is, when the another-language display processing means 52 determines that the portion of the comic 703 in the screen 700 has been clicked (S111; comic display region), it detects a position of the pointer of the mouse 5 (S112). Here, if the position of the detected pointer is not the blowoff frames 704a and 704b which display language (S113; NO), the another-language display processing means 52 displays nothing, and the processing returns back to step S102.

In contrast, when the another-language display processing means 52 determines that the position of the detected pointer is a portion of the blowoff frames 704a (S113; YES), it reads Korean image data $324_1$ for language C (refer to FIG. 5(*c*)) by relating, for example, the position information $321_1$ of the second data base 303b based on the detected position data (S114). Since the display mode is set to "VERTICAL" (S103), the another-language display processing means 52 arranges the Korean image data which corresponds to the words at the position of the blowoff frame 704a of the Korean image data $324_1$, in the right space portion of the image data of the comic 703 (S114).

Accordingly, Japanese contents in the blowoff frame 704a specified with the mouse 5 is displayed in the region 706 of the right space portion of the comic 703 on the display 3 as Korean sentences, as shown in FIG. 11.

1. 2. 5 Operation Example 4

Operation example 4 will be explained referring to step S102 again. Here, while looking at the screen 700 the mouse 5 is operated to select "FREE" from the mode selection window 701 on the screen 700, and additionally, "language C (Korean)" in the display language selection window 702 remains as shown in FIG. 12.

Then, since "FREE" in the mode selection window 701 is selected (S102; FREE), the another-language display processing means 52 sets the processing of the display mode of "FREE" (S104). Further, the another-language display processing means 52 determines that "language C (Korean)" is being selected in the display language selection window 702 (S106; Korean), it is set so that the Korean data can be read (S109).

Figure 12:
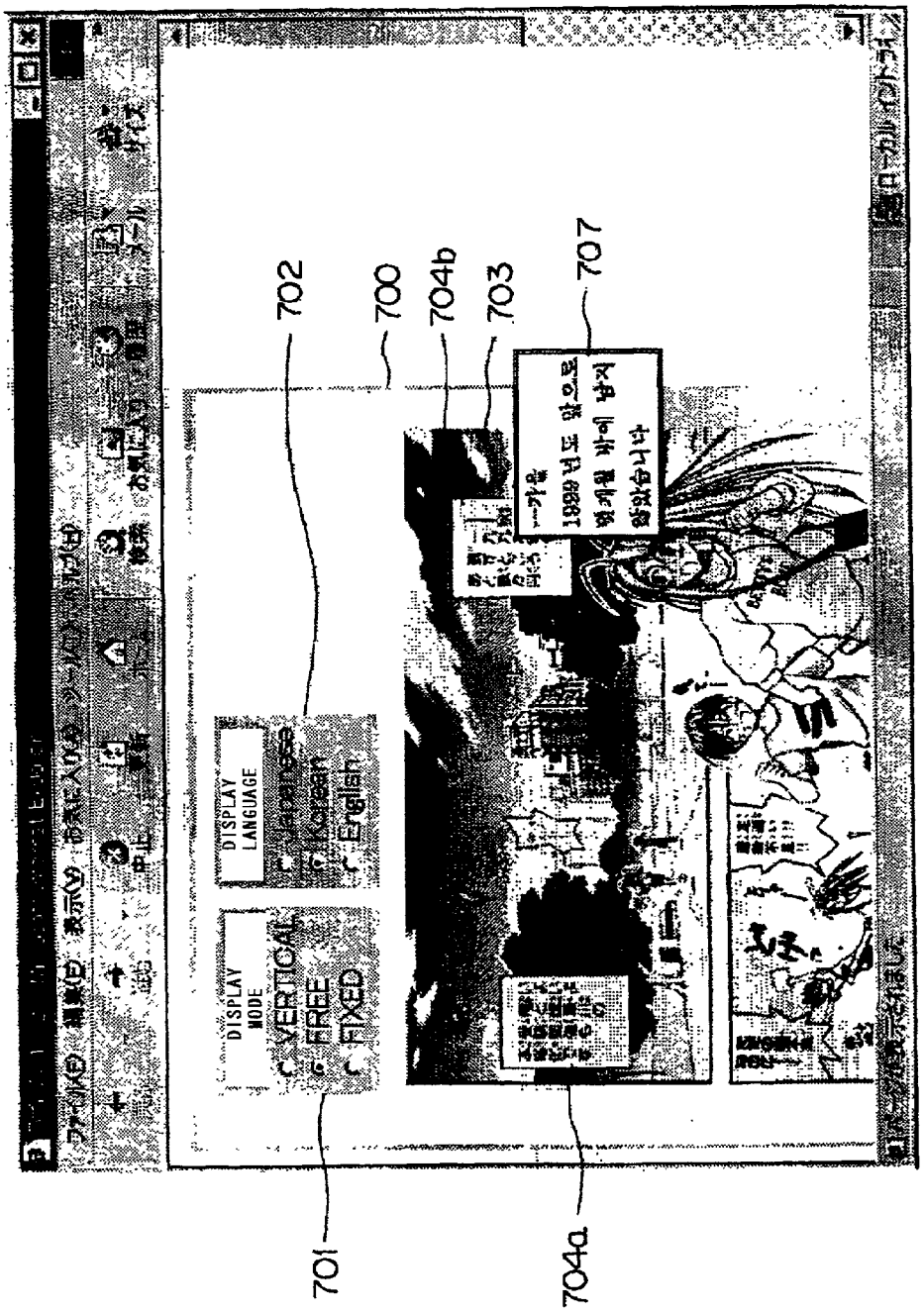
FIG. 12 is an explanatory view showing an display example of the expression of Korean in the case of the display mode of "FREE" in the display language conversion system according to the embodiment.

Next, the another-language display processing means 52 determines whether or not the screen 700 shown in FIG. 12 has been clicked with the mouse 5 (S110). Here, if the screen 700 is not clicked, the CPU 21 that functions as the another-language display processing means 52 continuously executes the display processing of the initial processing data, and processing is repeated as step S102→S104→S106→S109→S110→S102→ . . . .

On the other hand, when the screen 700 shown in FIG. 12 is clicked with the mouse 5, the another-language display processing means 52 determines the clicked contents (S110→S111).

That is, when the another-language display processing means 52 determines that the portion of the comic 703 in the screen 700 has been clicked (S111; comic display region), it detects a position of the pointer of the mouse 5 (S112). Here, if the position of the detected pointer is not the blowoff frames 704a and 704b which display language (S113; NO), the another-language display processing means 52 displays nothing, and the processing returns back to step S102.

In contrast, when the another-language display processing means 52 determines that the position of the detected pointer is a portion of the blowoff frames 704b (S113; YES), it reads Korean image data $324_1$ for language C (refer to FIG. 5(*c*)) by relating, for example, the position information $321_1$ of the second data base 303b based on the detected position data (S114). Since the display mode is set to "FREE" (S104), the another-language display processing means 52 arranges the Korean character data which corresponds to the words at the position of the blowoff frame 704b of the read Korean image data 324$_1$, in an optional position of the image data of the comic 703 (S114).

Accordingly, Japanese contents in the blowoff frame 704a specified with the mouse 5 is displayed in the region 707 of the optional position of the comic 703 on the display 3 as Korean sentences, as shown in FIG. 12.

1. 2. 6 Operation Example 5

Operation example 5 will be explained referring to step S102 again. Here, while looking at the screen 700, the mouse 5 is operated so that the selection of "FREE" from the mode selection window 701 on the screen 700 remains and the selection of "language C (Korean)" from the display language selection window 702 also remains, as shown in FIG. 13.

Then, since "FREE" in the mode selection window 701 is selected (S102; FREE), the another-language display processing means 52 sets the processing of the display mode of "FREE" (S104). Further, the another-language display processing means 52 determines that "language C (Korean)" is being selected in the display language selection window 702 (S106; Korean), it is set so that the Korean data can be read (S109).

Figure 13:
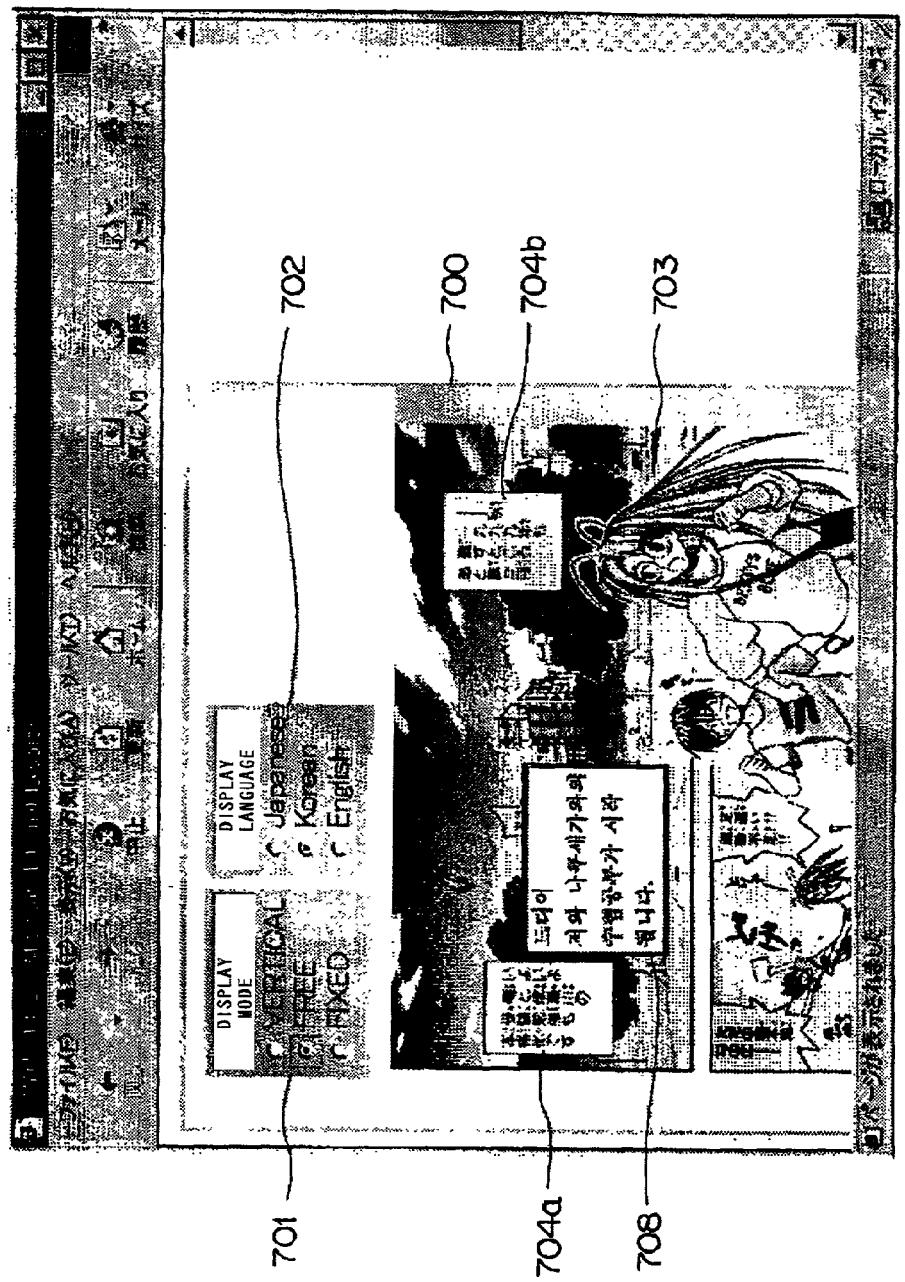
FIG. 13 is an explanatory view showing an display example of the expression of Korean in the case of the display mode of "FREE" in the display language conversion system according to the embodiment.

Next, the another-language display processing means 52 determines whether or not the screen 700 shown in FIG. 13 has been clicked with mouse 5 (S110).

Here, if the screen 700 shown in FIG. 13 is clicked with the mouse 5, the another-language display processing means 52 determines the clicked contents (S110→S111).

That is, when the another-language display processing means 52 determines that the portion of the comic 703 in the screen 700 has been clicked (S111; comic display region), it detects a position of the pointer of the mouse 5 (S112).

When the another-language display processing means 52 determines that the position of the pointer is a portion of the blowoff frames 704a (S113; YES), it reads Korean image data 324$_1$ for language C (refer to FIG. 5(c)) by relating it to the position information 321$_1$ of the second data base 303b based on the detected position data (S114). Since the display mode is set to "FREE" (S103), the another-language display processing means 52 arranges the Korean image data which corresponds to the words in the blowoff frame 704a of the read Korean image data 324$_1$, in an optional position of the image data of the comic 703 (S114).

Accordingly, Japanese contents in the blowoff frame 704a specified with the mouse 5 is displayed in the region 708 of the optional position of the comic 703 on the display 3 as Korean sentences, as shown in FIG. 13.

It should be noted that when the next screen is specified (for example, specified with arrow, scroll or the like) (S111; Next screen), the CPU 21 executes processing of incorporating the image data of the next screen (S115) and returns back to step S102.

Further, when end is specified (for example, specified by pushing the button on the right upper portion of the screen or by opening the file to select end) (S111; End), the CPU 21 ends the processing.

1. 3 Effects of First Embodiment

The display language conversion system according to the first Embodiment of the present invention comprises:

the first data base 303a, which stores base control data 311 for specifying the display mode and the display language, image data 312$_1$, 312$_2$, 312$_3$, . . . , such as an illustration, a photograph and a comic, and position information data 313$_1$, 313$_2$, 313$_3$, . . . , which specifies the blowoff frame and a predetermined commentary region;

the second data base 303b including language data which is related to the blowoff frame and a predetermined commentary region and corresponds to the words and the commentary, that is, Japanese character data 322$_1$, 322$_2$, 322$_3$, . . . , English character data 323$_1$, 323$_2$, 323$_3$, . . . , and Korean image data 324$_1$, 324$_2$, 324$_3$, . . . , ;

the screen display processing means 51 for displaying the control data 311, the image data 312$_1$, 312$_2$, 312$_3$, . . . , and the position information data 313$_1$, 313$_2$, 313$_3$, . . . read from the first data base 303a, and the Japanese character data 322$_1$, 322$_2$, 322$_3$, . . . , read from the second data base 303b as display data; and the another-language display processing means 52 in which when a display mode and a display language are specified by an image by the control data displayed in the display 3 and the operation of mouse 5, and the blowoff frame or a predetermined commentary display region is region specified by mouse 5, another language relating it to the second data base is displayed on the display 3 in accordance with the display mode. Thus, the display language conversion system according to the first Embodiment of the present invention has the following effects.

(1) A number of languages can be displayed without impairing the image of the original comics.

(2) The blowoff character languages can be freely set. That is, a plurality of blowoff frames or commentary display regions contained in one screen can be displayed by different languages every blowoff frame or commentary display region. Therefore, if the display language conversion system according to this embodiment is utilized as a teaching material for learning languages, learning effects can be enhanced by utilizing comics expressed by patterns and designs and selectively displaying only portions in the character's lines of comics or the commentary of a story, which cannot be translated by a user during the process of reading it.

(3) The display position of the blowoff characters can be freely set. That is, according to the display language conversion system of the first embodiment, "VERTICAL", "FREE" and "FIXED" can be selected as a display position. In particular, if "VERTICAL" is displayed as the display position, the area where a blowoff frame is overlapped on a portion of comics can be decreased. Thus, the image of the comics is not impaired. Alternatively, even if "FIXED" is displayed as the display position, blowoff frames for other languages are displayed while overlapping the blowoff frames contained in the comics. Thus, the area where a blowoff frame is overlapped on a portion of comics can be decreased.

(4) Special software is not needed and comics and various languages can be displayed.

(5) Since character which is not included in fonts can be possessed as image data, this invention can cope with various foreign languages.

1. 4 Modification Example of First Embodiment

In the above-described embodiment, the selection of the display mode and the language is performed by the operation of mouse 5. However, the selection thereof can be performed by means of keyboard 4 and another input device.

Further, although the above-described embodiment using three languages of Japanese, English and Korean have been described, they are not limited thereto. Alternatively, languages which can be used may be of course two or four or more, and may be any other language.

Additionally, the above-mentioned display language conversion system program 300 can be sold by storing it in a storage medium.

Here, the storage media include, for example, DVD, CD-ROM, CD-R/W, optical magnetic disk, ROM cartridge, battery backup RAM memory card, flash memory cartridge, nonvolatile RAM card, flexible disk, hard disk, magnetic tape and the like.

Further, the storage media include wire communication medium, such as a telephone line, internet, optical fiber or the like, and radio communication medium such as microwave line, optical communication or the like.

In summary, the storage medium is an element in which data or a program is recorded using any appropriate means, and which may be capable of downloading the digital data or the program to a processing unit such as a computer or a dedicated processor or the like to realize a predetermined function.

2. Second Embodiment (FIG. 14, FIGS. 1 to 6)

Next, the second embodiment of the present invention will be described with reference to FIG. 14 and FIGS. 1 to 6. Here, FIG. 14 is a block diagram showing an information selling system 60 according to the second embodiment of the present invention.

In these Figures, the information selling system 60 comprises a server unit 61 and user's terminal devices 63, 63, . . . , connected to this server unit 61 through a communication system 62.

Figure 14:
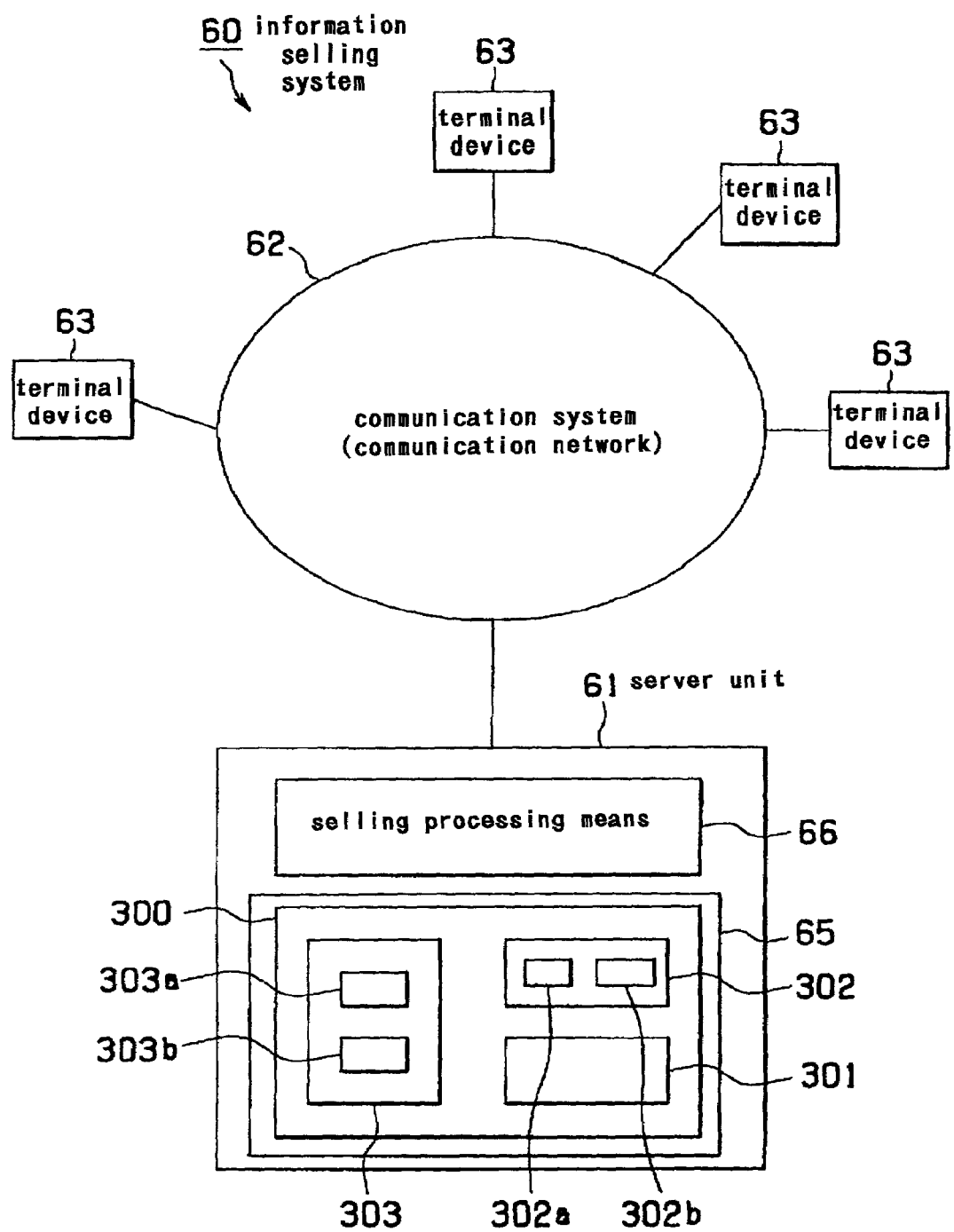
FIG. 14 is a block diagram showing an information selling system according to the second embodiment of the present invention.

The server unit 61 is comprised of a storage means 65, a selling processing means 66 and an operation processing means (not shown), as shown in FIG. 14.

In this storage means 65 is stored a display language conversion system program 300 similar to that of the above-mentioned first embodiment.

This display language conversion system program 300 is comprised of an operating system 301, an application program 302 and a data base 303, as explained above.

This data base 303 contains a first data base 303*a* and a second data base 303*b* as is similar to the first Embodiment.

The first data base 303*a* contains, as described above, the control data 111 for specifying the display mode or the display language, the image data $312_1$, $312_2$, $312_3$, . . . , such as illustrations, photographs, comics and the like and the position information data $313_1$, $313_2$, $313_3$, . . . , such as the blowoff frames, the display positions or display ranges of a predetermined commentary region corresponding to the image data $312_1$, $312_2$, $312_3$, . . . , respectively.

The second data base 303*b* contains the language data of the words or commentary corresponding to the position information data $313_1$, $313_2$, $313_3$, . . . of the blowoff frames and the predetermined commentary display regions, for example, Japanese character data $322_1$, $322_2$, $322_3$, . . . , English character data $323_1$, $323_2$, $323_3$, . . . , or Korean image data $324_1$, $324_2$, $324_3$, . . . .

The application program 302 of the display language conversion system program 300 comprises a first program 302*a* and a second program 302*b*.

The first program 302*a* is a program which realizes an image display processing means 51 which causes the image data and position information data read from the first data base 303*a*, and the Japanese character data $322_1$, $322_2$, $322_3$, . . . , read from the second data base 302*b* to display as the display data on a display means.

The second program 302*b* is a program in which when the display mode and the display language are specified by the display of the control data and the operation of mouse 5 and the blowoff frame or the predetermined commentary display region is region specified by the operation of mouse 5, the another-language display processing selection means 52 which displays another language corresponding to position data obtained by the region specification from the second data base 303*b*, for example, English character data $323_1$, $323_2$, $323_3$, . . . , or Korean image data $324_1$, $324_2$, $324_3$, . . . on the display 3 in accordance with the display mode, is realized.

The above-mentioned selling processing means 66 is formed as a means in which when sending of the application program 302 and data base 303 of the display language conversion system program 300 is required from the user's terminal device 63 and a predetermined condition (a condition that the payment of a fee, for example, was made or the like is confirmed) is fulfilled, the application program 302 and data base 303 of the display language conversion system program 300 is sent.

The operation processing means controls the entire operation.

Note that although described above, the second data base 303*b* uses the font data in the case of a language (for example, Japanese, alphabet) of the font which this system possesses, and image data is used in the case of another language (for example, Korean) of the font which this system does not possess.

The first program 302*b* which realizes the image display processing means 51 is comprised of a processing program in which when the blowoff frame or the commentary display region is specified by the input means, another language specified on a space portion on the screen displayed at the first display mode is displayed, another language specified at an optional position of the screen displayed at the second display mode is displayed, and another language specified in the blowoff frame or commentary display region specified at the third display mode is displayed.

According to the second embodiment described above, the display language conversion system program 300 other than the operating system 301 can be sold at remote areas via a communication network.

In the above-described first embodiment and second embodiment, although comics has been mainly explained, illustrations, photographs, commentaries or the like may be used. If commentaries are used, another language for the commentaries are displayed.

What is claimed is:

1. A display language conversion system in an image processing system by a computer comprising:

storage means adapted to store data base data, said data base data including image data, first language data and second language data;

an image display processing means adapted to read said data base data from said storage means and to convert said data base data into display data for display on a display means as a screen, said screen including a blowoff frame, said first language data being displayed within said blowoff frame; and another-language display processing means adapted to determine a position of a mouse pointer on said screen, wherein, when said mouse pointer is positioned at said blowoff frame, said another-language display processing means reads said second language data from said storage means and displays said second language data on said display means, wherein said another-language display processing means overlays said first language data with said second language data to display said second language data, wherein said another-language display processing means displays said second language data until said mouse pointer is positioned at another blowoff frame.

2. A storage medium that stores a program for functioning a computer as the display language conversion system according to claim 1.

3. An information selling system comprising a server device and a terminal device connected to the server device through a communication system, the server device being the display language conversion system according to claim 1.

* * * * *